United States Patent [19]

Fournel et al.

[11] 4,277,585
[45] Jul. 7, 1981

[54] VERTICAL AUTOCLAVE FOR BULK POLYMERIZATION OF VINYL CHLORIDE

[75] Inventors: Francis Fournel, Chauny; Salomon Soussan, St. Fons, both of France

[73] Assignee: Rhone-Progil, Courbevoie, France

[21] Appl. No.: 32,543

[22] Filed: Apr. 23, 1979

Related U.S. Application Data

[60] Continuation of Ser. No. 823,338, Aug. 10, 1977, abandoned, which is a division of Ser. No. 442,372, Feb. 14, 1974, abandoned.

[30] Foreign Application Priority Data

Feb. 16, 1973 [FR] France ................... 73.05537

[51] Int. Cl.³ .......................... C08F 2/02; C08F 14/06
[52] U.S. Cl. .................... 526/65; 260/95 R; 422/135; 526/75; 526/88; 526/344.1
[58] Field of Search .................... 422/135; 526/65, 75, 526/88, 344.1, 345

[56] References Cited

U.S. PATENT DOCUMENTS

| 3,354,136 | 11/1967 | Crawford | 260/95 R |
| 3,522,227 | 7/1970 | Thomas | 526/330 X |
| 3,759,879 | 9/1973 | Floros | 526/345 X |
| 3,987,021 | 10/1976 | Rothert | 260/95 R |

Primary Examiner—C. A. Henderson
Attorney, Agent, or Firm—McDougall, Hersh & Scott

[57] ABSTRACT

A vertical autoclave suitable for the bulk polymerization of vinyl chloride based polymers and copolymers embodying agitation means comprising at least one agitator (A) in the form of helicoidal ribbon about a rotatable shaft in the upper portion of the autoclave and an agitator (B) having a rotatable shaft passing through the bottom portion of the autoclave with at least one arm located adjacent to and having a profile corresponding to the bottom of the autoclave, and means for independently driving the agitators (A) and/or (B).

4 Claims, 4 Drawing Figures

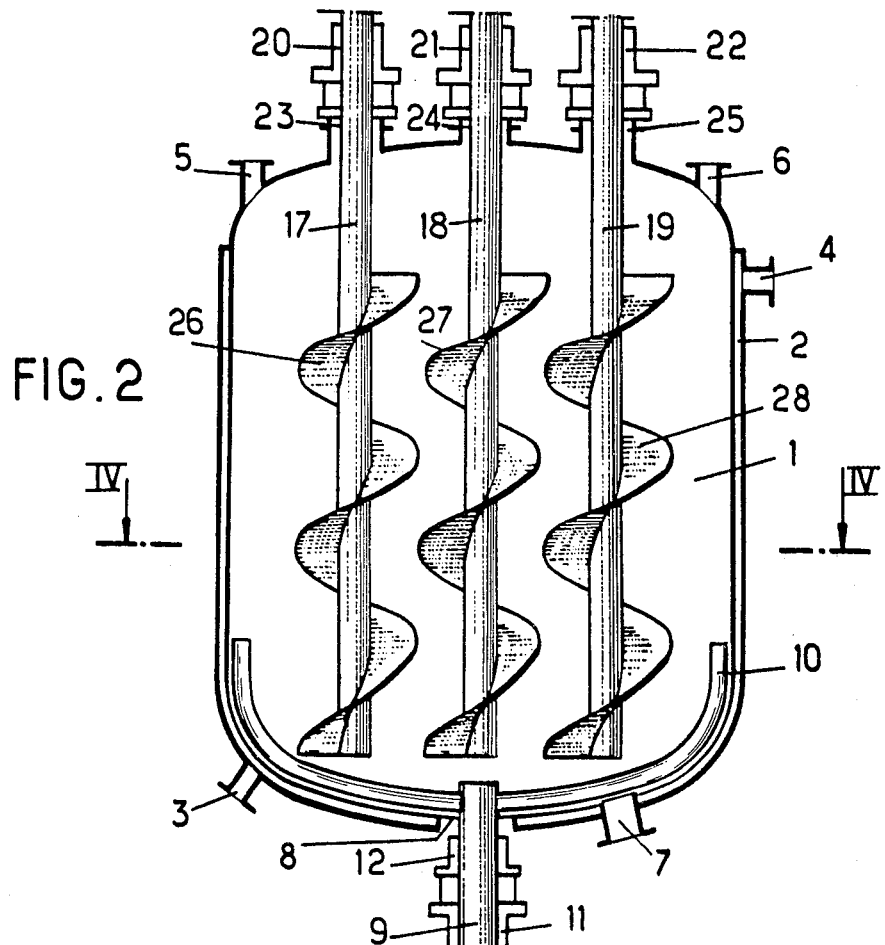
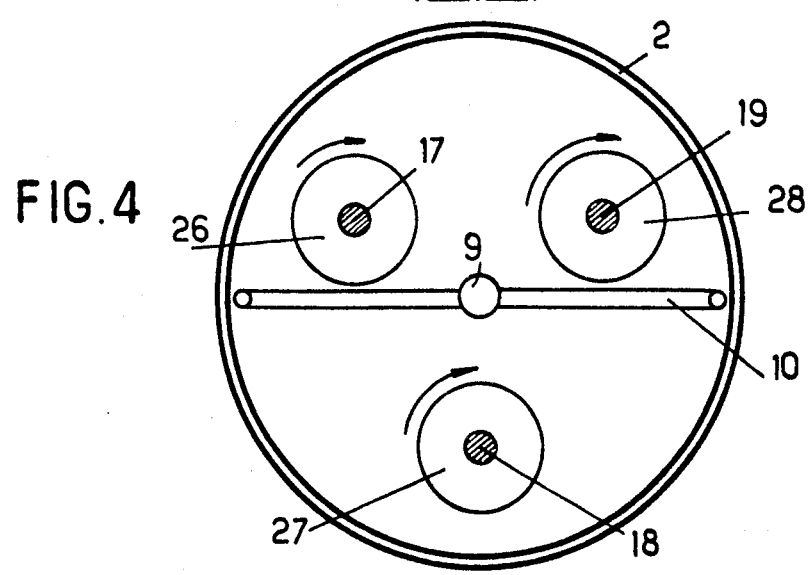

VERTICAL AUTOCLAVE FOR BULK POLYMERIZATION OF VINYL CHLORIDE

This application is a continuation of U.S.application Ser. No. 823,338, filed Aug. 10, 1977 (now abandoned), which application was a division of U.S. application Ser. No. 442,372, filed Feb. 14, 1974 (now abandoned) and entitled "Vertical Autoclave for Bulk Polymerization of Vinyl Chloride Based Polymers and Copolymers." Application Ser. No. 823,340 was also filed on Aug. 10, 1977, as a continuation of U.S. application Ser. No. 442,372 and has materialized as U.S. Pat. No. 4,198,376 issued Apr. 15, 1980.

BACKGROUND OF THE INVENTION

This invention relates to a vertical autoclave for bulk preparation of vinyl chloride based copolymers and polymers. It also relates to a method of preparation, in bulk, of vinyl chloride based polymers and copolymers which employs said autoclave.

It has already been suggested to effect preparation in bulk, of vinyl chloride polymers and copolymers in two stages carried out in different vessels by a method consisting of carrying out, in the first stage, a limited polymerization, known as prepolymerization, with agitation at high turbulence, until a conversion of the monomer or monomers of the order of 7% to 15% is achieved, then to effect, in a second stage, a final polymerization operation under low agitation, the speed of agitation in this step however remaining sufficient to maintain the temperature of the reaction medium substantially uniform until the end of the polymerization or copolymerization reaction.

This process and variatiions thereon have been described in French Patents and Certificates of Addition Nos. 1,382,072, 84,958, 84,965, 84,966, 85,672, 89,025 and Nos. 1,436,744, 87,620, 87,623, 87,625, 87,626.

SUMMARY OF THE INVENTION

In a particular embodiment of the process, the final polymerization is effected in a vertical autoclave provided with an agitator comprising a single agitator element consisting of at least one ribbon wound in helicoidal turns, fixed by means of at least one support member, on a rotating shaft extending into the autoclave along the axis of symmetry thereof and integral, at its lower end, with at least one arm which is adjacent and follows the shape of the curved bottom of the autoclave.

Such agitation apparatus has the following disadvantages, which increase with the size of the autoclave;

The agitator must be constructed in two parts to be assembled inside the autoclave if it is desired to use a one-piece autoclave vessel; the use of two-piece vessels, in which the vessel parts are held together by a large flange or the like, considerably increases the cost.

Withdrawal of the agitator from a one-piece autoclave cannot be carried out without initial cutting.

The vertical shaft has to be supported in a mounting at its lower end to avoid unacceptable stress on the associated mechanical equipment at the top of the autoclave.

The driving equipment has to have a large power transmission capacity because the speed of rotation of the ribbon, which detemines the efficiency of mixing, is equal to that of the arm or arms which are integral with the rotating shaft, and the latter consume an increased amount of power at certain critical phases of the process, especially at the end of the operation of polymerization during degassing of the monomeric composition which has not reacted and breaking of the vacuum.

The design is complicated, in the case of embodiments having facilities for internal cooling by circulation of refrigerating fluid.

The autoclave, according to the present invention, is intended and has for its object to avoid or reduce the disadvantages mentioned above.

According to one aspect of the invention, there is provided a vertical autoclave suitable for the bulk preparation of vinyl chloride polymers and copolymers provided with agitation means comprising at least one agitator (A) formed of a ribbon coiled in helicoidal turns about a rotatable shaft passing through the upper part of the autoclave and an agitator (B) comprising a rotatable shaft passing through the bottom of the autoclave along the vertical axis of symmetry thereof, connected to at least one arm adjacent to and having a profile close to the bottom of the autoclave, the agitator or agitators (A) and the agitator (B) being independently driven.

The agitator (B) generally comprises two arms. The agitators (A) and (B) may be hollow and have a heat exchange fluid circulating therein.

According to one embodiment of the invention, a single agitator (A) and the agitator (B) are coaxial.

According to another embodiment of the invention, agitators (A) are equidistant from the central axis of the autoclave and arranged in a generally regular manner about said axis. For example, agitators (A) may be three in number, equidistant from said axis and arranged at the corners of an equilateral triangle. This embodiment is especially favorable in the case of an autoclave of large capacity since it avoids the use of a very large transmission for driving agitators (A), which requires special design and construction.

BRIEF DESCRIPTION OF THE DRAWINGS

Two embodiments of the invention will now be described by way of illustration, with reference to the accompanying drawings, in which

FIG. 2 is a sectional view similar to that of FIG. 1 showing a modification in an autoclave embodying the features of this invention;

FIG. 4 is a sectional view taken along line IV—IV of FIG. 2.

DESCRIPTION OF THE PREFERRED EMBODIMENT

Figure 1:
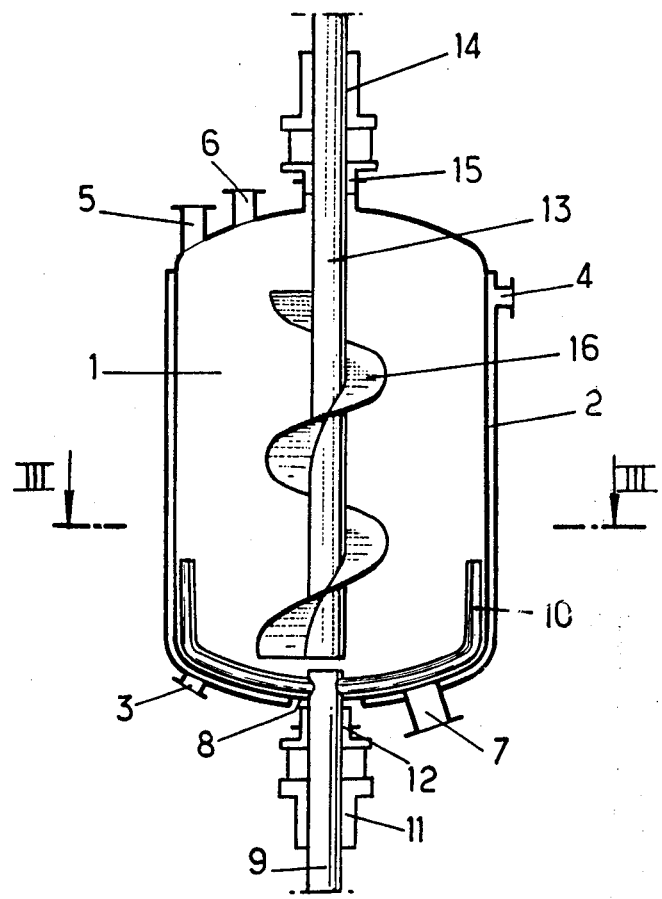
FIG. 1 is a vertical cross section along the central axis of an autoclave embodying the features of this invention.
Figure 3:
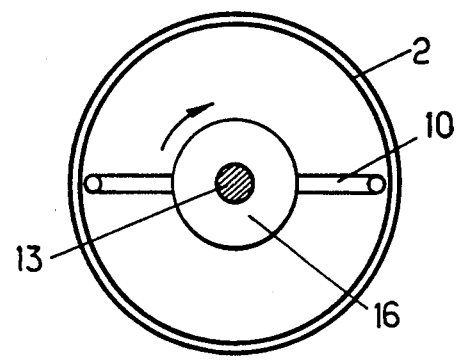
FIG. 3 is a horizontal sectional view taken along line III—III of FIG. 1.

The embodiments of FIGS. 1 and 3 comprises a single agitator (A). The embodiment of FIGS. 2 and 4 has three agitators (A).

As shown in the drawings, a vertical axis autoclave 1 is surrounded by a jacket 2 in which a heat exchange fluid is circulated from an entrance at inlet 3 to an exit at outlet 4. The autoclave 1 comprises, at its upper part, an inlet 5 through which prepolymer and the necessary other reactants and possibly monomers are introduced and an outlet 6 for removal of the monomeric composition which has not reacted at the end of the operation. At its lower part, autoclave 1 has an outlet 7 for discharge of the polymer. The bottom 8 of the autoclave 1 is provided with a shaft 9 to which are connected two arms 10 and which is supported by the bearing 11, the liquid tightness between the shaft and the bottom of the autoclave being assured by the stuffing box 12.

As shown in the embodiment of FIGS. 1 and 3, the upper part of the autoclave 1 is provided with a shaft 13 mounted for rotational movement along the central axis of the autoclave and supported by the bearing 14, a fluid tight seal between the shaft and the upper part of the autoclave being assured by means of a stuffing box 15. A ribbon 16 is wound in helicoidal turns on the shaft 13.

In the embodiment of FIGS. 2 and 4, the upper part of the autoclave 1 is traversed by three rotatable shafts 17, 18 and 19 which are equidistantly spaced from the central axis of the autoclave, arranged at the apices of an equilateral triangle, and supported respectively by the bearings 20, 21 and 22, the fluid tightness between the rotatable shafts and the upper part of the autoclave being assured by means of stuffing boxes 23, 24 and 25. On the rotatable shafts 17, 18 and 19, ribbons 26, 27 and 28 are respectively arranged in helicoidal turns.

The autoclave, according to the invention, has the following advantages when used for the final bulk polymerization of vinyl chloride based polymers and copolymers in two stages, carried out in different respective vessels.

The possibility of using the optimum speeds for each of the agitators (A) and (B) and of reversing the sense of rotation of one or both to obtain optimum stirring.

The possibility of reducing the speed of agitator (B). when desired, and of stopping the or one of the agitators (A) during evacuation of the autoclave to reduce the amount of power consumed.

A less complex arrangement of the cooling circuits in embodiments using fluid circulation in the agitators (A) and (B).

The use of integral components for the agitators, which are relatively light and therefore easy to manufacture and to mount without welding at the interior of the autoclave.

The possibility of cooling agitators (A) and (B) to different temperatures.

Formation of crust is reduced due to more efficient agitation of the reaction medium in the lower part of the autoclave.

The possibility of keeping only one agitator in use in the case of failure of power supply, which allows for a reduction in the power of the standby electricity provided when the agitators are driven electrically.

The possibility of cleaning the autoclave by means of a jet of water under very high pressure fed from a head, preferably rotating, which is introduced in the proximity of agitator (B) to reach the parts where the possibility of formation of crust is high and where crusts formed are especially adherent. This advantage avoids the necessity for manual operations inside the autoclave and the risk of accident which may result therefrom.

We claim:

1. A process for bulk preparation of vinyl chloride polymers or copolymers insoluble in the initial monomeric composition which comprises prepolymerizing a composition based on vinyl chloride until a conversion of 7–15% of monomeric composition is achieved and a fluid prepolymerized medium is thus obtained, transferring the prepolymerized medium into a vertical autoclave, subjecting the prepolymerized medium to final polymerization in the vertical autoclave during which the medium converts from a fluid phase to a solid powdered phase, maintaining the fluid phase and the solid powdered phase upon conversion under continuous agitation during the final polymerization in the vertical autoclave by (a) subjecting the medium to agitation with a helicoidal ribbon that extends downwardly into the autoclave for rotation about a vertical axis, (b) concurrently subjecting the medium to agitation with at least one arm having a profile close to the base of the autoclave and which moves across the bottom portion of the autoclave below the helicoidal ribbon during rotational movement about a vertical axis, and rotating the one agitator independently of the other.

2. The process as claimed in claim 1 in which the vertical axis about which the helicoidal ribbon turns is along the vertical axis of symmetry of the autoclave.

3. The process as claimed in claim 1 in which the medium is engaged for agitation by a plurality of helicoidal ribbons rotatable about axes equidistantly arranged about the central axis of the autoclave.

4. The process as claimed in claim 3 in which the medium is engaged for agitation by three helicoidal ribbons rotatable about axes, equidistantly spaced about the central axis of the autoclave.

* * * * *